United States Patent
Naik et al.

(10) Patent No.: US 12,072,103 B2
(45) Date of Patent: Aug. 27, 2024

(54) TURBINE ENGINE FUEL PREMIXER

(71) Applicant: GENERAL ELECTRIC COMPANY, Schenectady, NY (US)

(72) Inventors: Pradeep Naik, Bengaluru (IN); Manampathy G. Giridharan, Evendale, OH (US); Ajoy Patra, Bengaluru (IN); R Narasimha Chiranthan, Bengaluru (IN)

(73) Assignee: General Electric Company, Cincinnati, OH (US)

( * ) Notice: Subject to any disclaimer, the term of this patent is extended or adjusted under 35 U.S.C. 154(b) by 30 days.

(21) Appl. No.: 17/699,735

(22) Filed: Mar. 21, 2022

(65) Prior Publication Data
US 2023/0213194 A1 Jul. 6, 2023

Related U.S. Application Data

(60) Provisional application No. 63/295,015, filed on Dec. 30, 2021.

(51) Int. Cl.
*F23R 3/14* (2006.01)
*F23R 3/28* (2006.01)

(52) U.S. Cl.
CPC .............. *F23R 3/286* (2013.01); *F23R 3/14* (2013.01); *F23R 2900/03042* (2013.01)

(58) Field of Classification Search
CPC .. F23R 3/14; F23R 3/286; F23R 3/343; F23R 2900/03042
See application file for complete search history.

(56) References Cited

U.S. PATENT DOCUMENTS

| | | | |
|---|---|---|---|
| 5,836,164 A * | 11/1998 | Tsukahara | F23R 3/34 60/737 |
| 5,929,450 A | 7/1999 | Glasheen et al. | |
| 8,616,002 B2 | 12/2013 | Kraemer et al. | |
| 10,995,679 B2 | 5/2021 | Abe et al. | |
| 2008/0078182 A1 | 4/2008 | Evulet | |
| 2012/0186255 A1 | 7/2012 | Parsania et al. | |
| 2012/0282558 A1 | 11/2012 | Kraemer et al. | |
| 2013/0086910 A1 | 4/2013 | Khan et al. | |
| 2016/0281990 A1 | 9/2016 | Stuttaford et al. | |
| 2019/0137105 A1 | 5/2019 | Seok | |

FOREIGN PATENT DOCUMENTS

| | | |
|---|---|---|
| CN | 101963354 A | 2/2011 |
| CN | 102549341 A | 7/2012 |
| DE | 102006053679 A1 | 5/2007 |
| DE | 102011116317 A1 | 4/2013 |
| EP | 1916481 A2 | 4/2008 |
| EP | 3521593 B1 | 8/2020 |
| JP | 2010159761 A | 7/2010 |
| JP | 5473934 B2 | 4/2014 |
| KR | 1020080029858 A | 4/2008 |

* cited by examiner

*Primary Examiner* — Arun Goyal
(74) *Attorney, Agent, or Firm* — McGarry Bair PC

(57) ABSTRACT

A turbine engine can include a compressor section, a combustion section, and a turbine section in serial flow arrangement. The combustion section can include a combustor with a fuel premixer. The fuel premixer can include an annular shroud defining an interior, a center body located within the interior, and an annular swirler located within the interior.

20 Claims, 10 Drawing Sheets

TURBINE ENGINE FUEL PREMIXER

CROSS-REFERENCE TO RELATED APPLICATION(S)

This application claims the benefit of U.S. Provisional Patent Application No. 63/295,015, filed Dec. 30, 2021, which is incorporated herein by reference in its entirety.

TECHNICAL FIELD

The present subject matter relates generally to a turbine engine combustor, and, more specifically to a fuel premixer for the combustor.

BACKGROUND

A gas turbine engine includes a turbine that is driven by combustion of a combustible fuel within a combustion chamber of the turbine engine. A fuel nozzle injects combustible fuel into the combustor while a swirler mixes the fuel with air for more efficient combustion.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
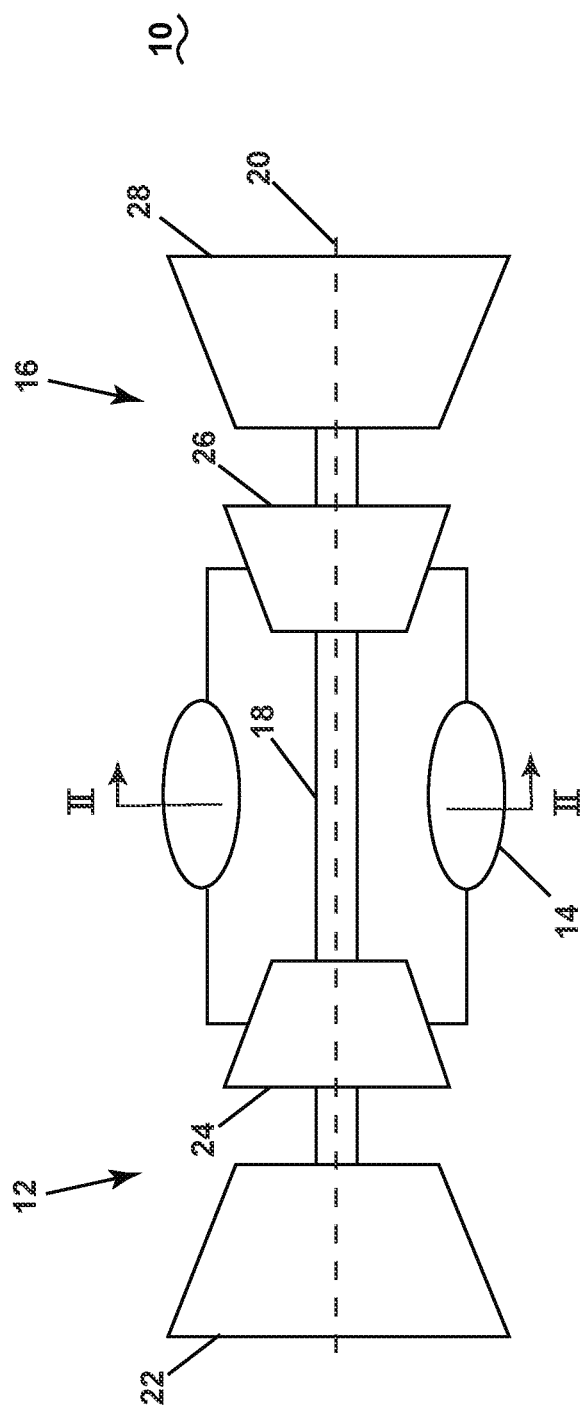
FIG. 1 is a schematic view of a turbine engine having a compression section, a combustion section, and a turbine section in accordance with various aspects described herein.

Aspects of the disclosure herein are directed to a fuel premixer located within an engine component, and more specifically to a fuel premixer configured for use with heightened combustion engine temperatures, such as those utilizing a hydrogen fuel. For purposes of illustration, the present disclosure will be described with respect to a turbine engine for an aircraft with a combustor driving the turbine. It will be understood, however, that aspects of the disclosure herein are not so limited and may have general applicability within an engine, including but not limited to turbojet, turboprop, turboshaft, and turbofan engines. Aspects of the disclosure discussed herein may have general applicability within non-aircraft engines having a combustor, such as other mobile applications and non-mobile industrial, commercial, and residential applications.

Reference will now be made in detail to the combustor architecture, and in particular the fuel premixer for providing fuel to the combustor located within a turbine engine, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all aspects described herein should be considered exemplary.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

The term "fluid" may be a gas or a liquid. The term "fluid communication" means that a fluid is capable of making the connection between the areas specified.

Additionally, as used herein, the terms "radial" or "radially" refer to a direction away from a common center. For example, in the overall context of a turbine engine, radial refers to a direction along a ray extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate structural elements between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

The singular forms "a", "an", and "the" include plural references unless the context clearly dictates otherwise. Furthermore, as used herein, the term "set" or a "set" of elements can be any number of elements, including only one.

Approximating language, as used herein throughout the specification and claims, is applied to modify any quantitative representation that could permissibly vary without resulting in a change in the basic function to which it is related. Accordingly, a value modified by a term or terms, such as "about", "approximately", "generally", and "substantially", are not to be limited to the precise value specified. In at least some instances, the approximating language may correspond to the precision of an instrument for measuring the value, or the precision of the methods or machines for constructing or manufacturing the components and/or systems. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values. Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

"Substantially annular" with respect to a duct or flowpath, such as a duct or flowpath with a heat exchanger positioned therein, refers to a duct or flowpath that is fully annular (i.e., extends continuously and uninterrupted in a circumferential direction with the exception of only the heat exchanger), or partially annular with at least 50% volume percent of void with the exception of the heat exchanger (such as at least 60%, such as at least 70%, such as at least 80%, such as at least 90% volume percent of void with the exception of the heat exchanger).

In certain exemplary aspects of the present disclosure, a turbine engine defining a centerline and a circumferential direction is provided. The gas turbine engine may generally include a turbomachine and a rotor assembly. The rotor assembly may be driven by the turbomachine. The turbomachine, the rotor assembly, or both may define a substantially annular flowpath relative to the centerline of the gas turbine engine. The turbine engine includes a combustor positioned upstream of the turbine configured to drive the turbine.

The combustor introduces fuel from a fuel nozzle, which is mixed with swirling, turbulent air generated by a swirler, and then combusted within the combustion chamber to generate combustion gases that drive the turbine. Increases in efficiency and reduction in emissions have driven the need to use fuel that burns cleaner or at higher temperatures, such as utilizing hydrogen fuel. There is a need to improve durability of the combustor under these operating parameters, such as improved flame control to prevent flame holding on the fuel nozzle and swirler components. The inventors' practice has proceeded in the manner of designing a fuel nozzle and swirler to meet durability requirements for increased engine temperatures and hydrogen fuel.

FIG. 1 is a schematic view of a turbine engine 10. As a non-limiting example, the turbine engine 10 can be used within an aircraft. The turbine engine 10 can include, at least, a compressor section 12, a combustion section 14, and a turbine section 16. A drive shaft 18 rotationally couples the compressor section 12 and turbine section 16, such that rotation of one affects the rotation of the other, and defines a rotational axis 20 for the turbine engine 10.

The compressor section 12 can include a low-pressure (LP) compressor 22, and a high-pressure (HP) compressor 24 serially fluidly coupled to one another. The turbine section 16 can include an HP turbine 26, and an LP turbine 28 serially fluidly coupled to one another. The drive shaft 18 can operatively couple the LP compressor 22, the HP compressor 24, the HP turbine 26 and the LP turbine 28 together. Alternatively, the drive shaft 18 can include an LP drive shaft (not illustrated) and an HP drive shaft (not illustrated). The LP drive shaft can couple the LP compressor 22 to the LP turbine 28, and the HP drive shaft can couple the HP compressor 24 to the HP turbine 26. An LP spool can be defined as the combination of the LP compressor 22, the LP turbine 28, and the LP drive shaft such that the rotation of the LP turbine 28 can apply a driving force to the LP drive shaft, which in turn can rotate the LP compressor 22. An HP spool can be defined as the combination of the HP compressor 24, the HP turbine 26, and the HP drive shaft such that the rotation of the HP turbine 26 can apply a driving force to the HP drive shaft which in turn can rotate the HP compressor 24.

The compressor section 12 can include a plurality of axially spaced stages. Each stage includes a set of circumferentially-spaced rotating blades and a set of circumferentially-spaced stationary vanes. The compressor blades for a stage of the compressor section 12 can be mounted to a disk, which is mounted to the drive shaft 18. Each set of blades for a given stage can have its own disk. The vanes of the compressor section 12 can be mounted to a casing which can extend circumferentially about the turbine engine 10. It will be appreciated that the representation of the compressor section 12 is merely schematic and that there can be any number of blades, vanes and stages. Further, it is contemplated that there can be any number of other components within the compressor section 12.

Similar to the compressor section 12, the turbine section 16 can include a plurality of axially spaced stages, with each stage having a set of circumferentially-spaced, rotating blades and a set of circumferentially-spaced, stationary vanes. The turbine blades for a stage of the turbine section 16 can be mounted to a disk which is mounted to the drive shaft 18. Each set of blades for a given stage can have its own disk. The vanes of the turbine section can be mounted to the casing in a circumferential manner. It is noted that there can be any number of blades, vanes and turbine stages as the illustrated turbine section is merely a schematic representation. Further, it is contemplated that there can be any number of other components within the turbine section 16.

The combustion section 14 can be provided serially between the compressor section 12 and the turbine section 16. The combustion section 14 can be fluidly coupled to at least a portion of the compressor section 12 and the turbine section 16 such that the combustion section 14 at least partially fluidly couples the compressor section 12 to the turbine section 16. As a non-limiting example, the combustion section 14 can be fluidly coupled to the HP compressor 24 at an upstream end of the combustion section 14 and to the HP turbine 26 at a downstream end of the combustion section 14.

During operation of the turbine engine 10, ambient or atmospheric air is drawn into the compressor section 12 via a fan (not illustrated) upstream of the compressor section 12, where the air is compressed defining a pressurized air. The pressurized air can then flow into the combustion section 14 where the pressurized air is mixed with fuel and ignited, thereby generating combustion gases. Some work is extracted from these combustion gases by the HP turbine 26, which drives the HP compressor 24. The combustion gases are discharged into the LP turbine 28, which extracts additional work to drive the LP compressor 22, and the exhaust gas is ultimately discharged from the turbine engine 10 via an exhaust section (not illustrated) downstream of the turbine section 16. The driving of the LP turbine 28 drives the LP spool to rotate the fan (not illustrated) and the LP compressor 22. The pressurized airflow and the combustion gases can together define a working airflow that flows through the fan, compressor section 12, combustion section 14, and turbine section 16 of the turbine engine 10.

Figure 2:
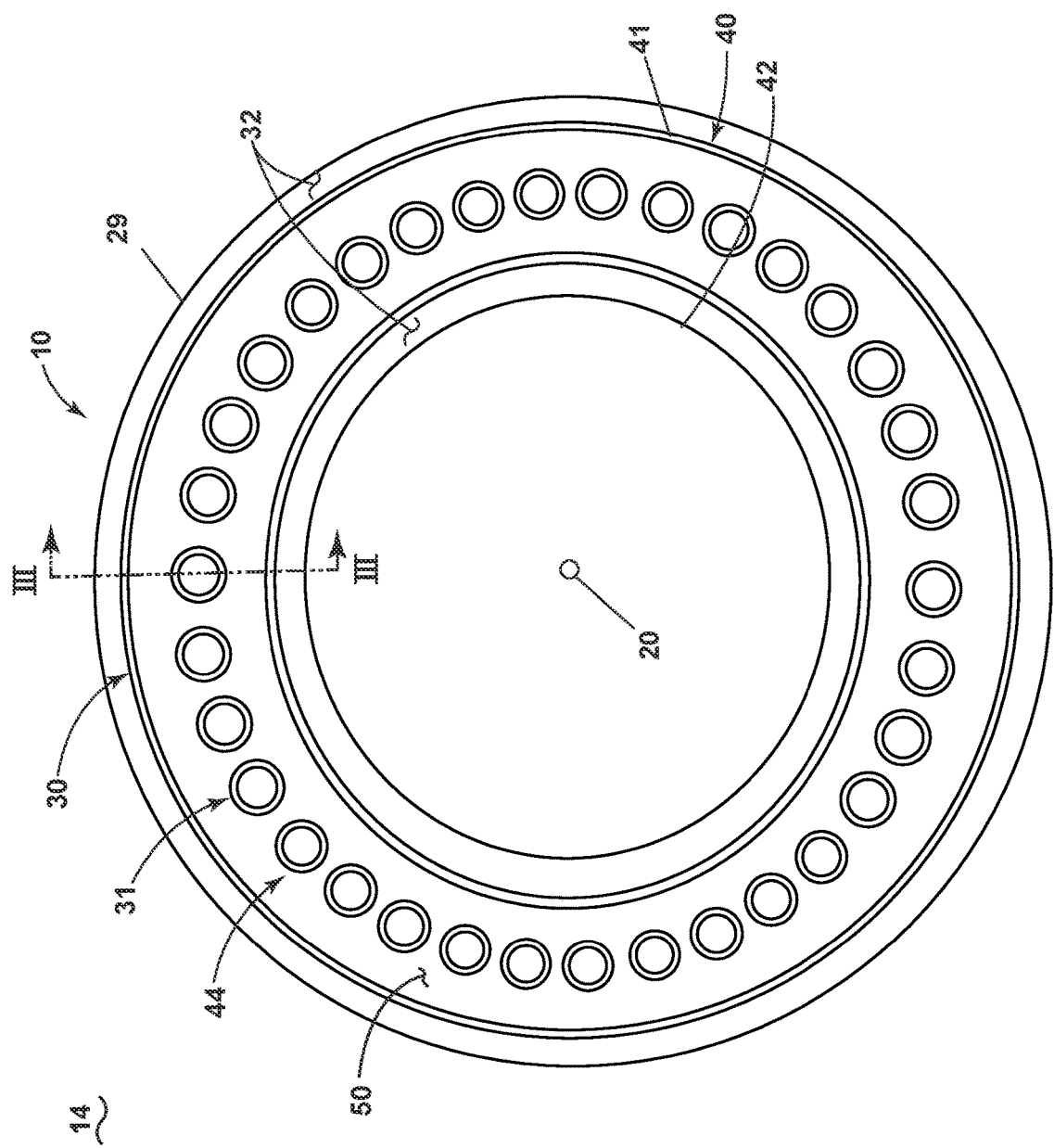
FIG. 2 is a cross-sectional view of the combustion section of FIG. 1 along line II-II in accordance with various aspects described herein.

FIG. 2 depicts a cross-sectional view of the combustion section 14 along line II-II of FIG. 1. The combustion section 14 can include a combustor 30 with an annular arrangement of fuel injectors 31 disposed around the centerline or rotational axis 20 of the turbine engine 10. It should be appreciated that the annular arrangement of fuel injectors 31 can be one or multiple fuel injectors, and one or more of the fuel injectors 31 can have different characteristics. The combustor 30 can have a can, can-annular, or annular arrangement depending on the type of engine in which the combustor 30 is located. In a non-limiting example, the combustor 30 can have a combination arrangement located with a casing 29 of the engine.

The combustor 30 can be at least partially defined by a combustor liner 40. In some examples, the combustor liner 40 can include an outer liner 41 and an inner liner 42 concentric with respect to each other and arranged in an annular fashion about the engine centerline or rotational axis 20. In some examples, the combustor liner 40 can have an annular structure about the combustor 30. In some examples, the combustor liner 40 can include multiple segments or portions collectively forming the combustor liner 40. A dome assembly 44 together with the combustor liner 40 can at least partially define a combustion chamber 50 arranged annularly about the rotational axis 20. A compressed air passage 32 can be defined at least in part by both the combustor liner 40 and the casing 29.

Figure 3:
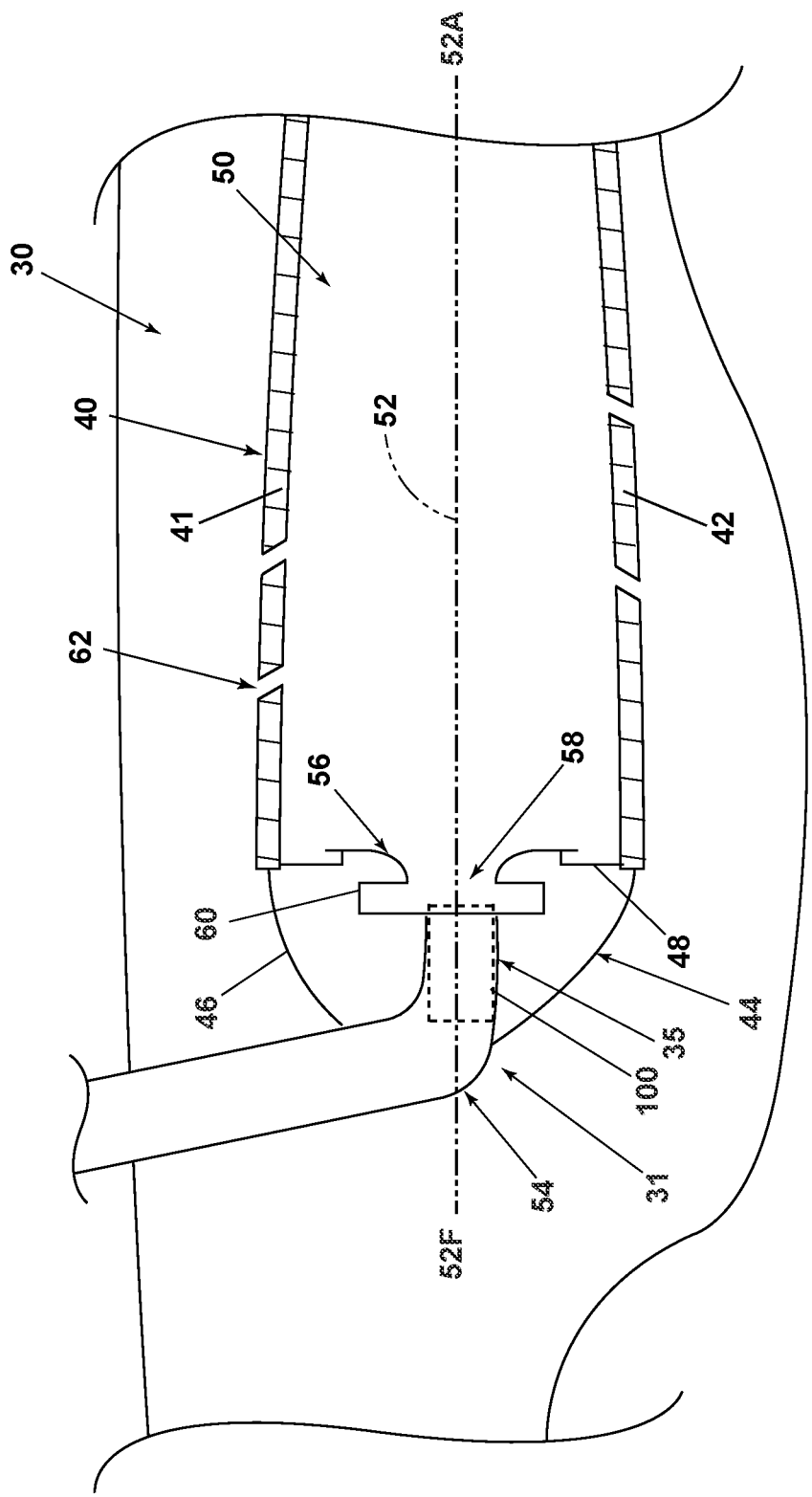
FIG. 3 is a cross-sectional view along line III-III of FIG. 2 illustrating a combustor in accordance with various aspects described herein.

FIG. 3 depicts a cross-sectional view taken along line III-III of FIG. 2 illustrating the combustor 30. The combustor 30 can include a fuel assembly 35 configured to provide fuel to the combustor 30. The fuel assembly 35 can at least partially form the fuel injector 31. In some examples, the fuel assembly 35 can include an annular arrangement of fuel nozzles. It should be appreciated that such fuel nozzles can be organized in any suitable arrangement, pattern, grouping, or the like.

The dome assembly 44 can include a dome wall 46 and a deflector 48. The combustor liner 40 and dome assembly 44 can collectively at least partially define the combustion chamber 50 about a longitudinal axis 52. The longitudinal axis 52 can extend between a forward direction 52F and an aft direction 52A as shown.

At least one fuel supply 54 can be fluidly coupled to the combustion chamber 50 to supply fuel to the combustor 30. The fuel can include any suitable fuel, including hydrocarbon fuel, hydrogen fuel, or a mixture of differing fuel types, in non-limiting examples.

The fuel supply 54 can be disposed within the dome assembly 44 to define a fuel outlet 58. It is contemplated that air can also be supplied or provided to the combustion chamber 50 by way of the fuel outlet 58. In this manner, the fuel outlet 58 can provide a fuel-air mixture to the combustion chamber 50. In addition, in some examples, multiple fuel injectors or premixers can be located on the dome wall 46. In some examples, multiple fuel injectors or premixers can be arranged in discrete clusters or groups on the dome wall 46.

A flare cone 56 can be provided downstream of the fuel supply 54 in some examples. An annular swirler 60 (or "swirler 60") can also be provided at the fuel assembly 35. The swirler 60 can be an annular swirler located within the interior of an annular shroud. The swirler 60 can include static vanes, angled passages, or the like. The swirler 60 can be configured to swirl incoming air in proximity to fuel exiting the fuel supply 54. The swirler 60 can also provide a mixture of air and fuel entering the combustor 30.

A set of dilution holes 62 can be provided in the combustor liner 40 and configured to direct air into the combustion chamber 50 for temperature control, flame shaping, fuel-air mixing, or the like. Any number of dilution holes can be provided in the set of dilution holes 62. The set of dilution holes 62 can have any suitable patterning or arrangement over the combustor liner 40, including linear rows, irregular groups, variable hole diameters, or the like, or combinations thereof. It is also contemplated that the combustor 30 can be formed without any dilution holes.

Figure 4:
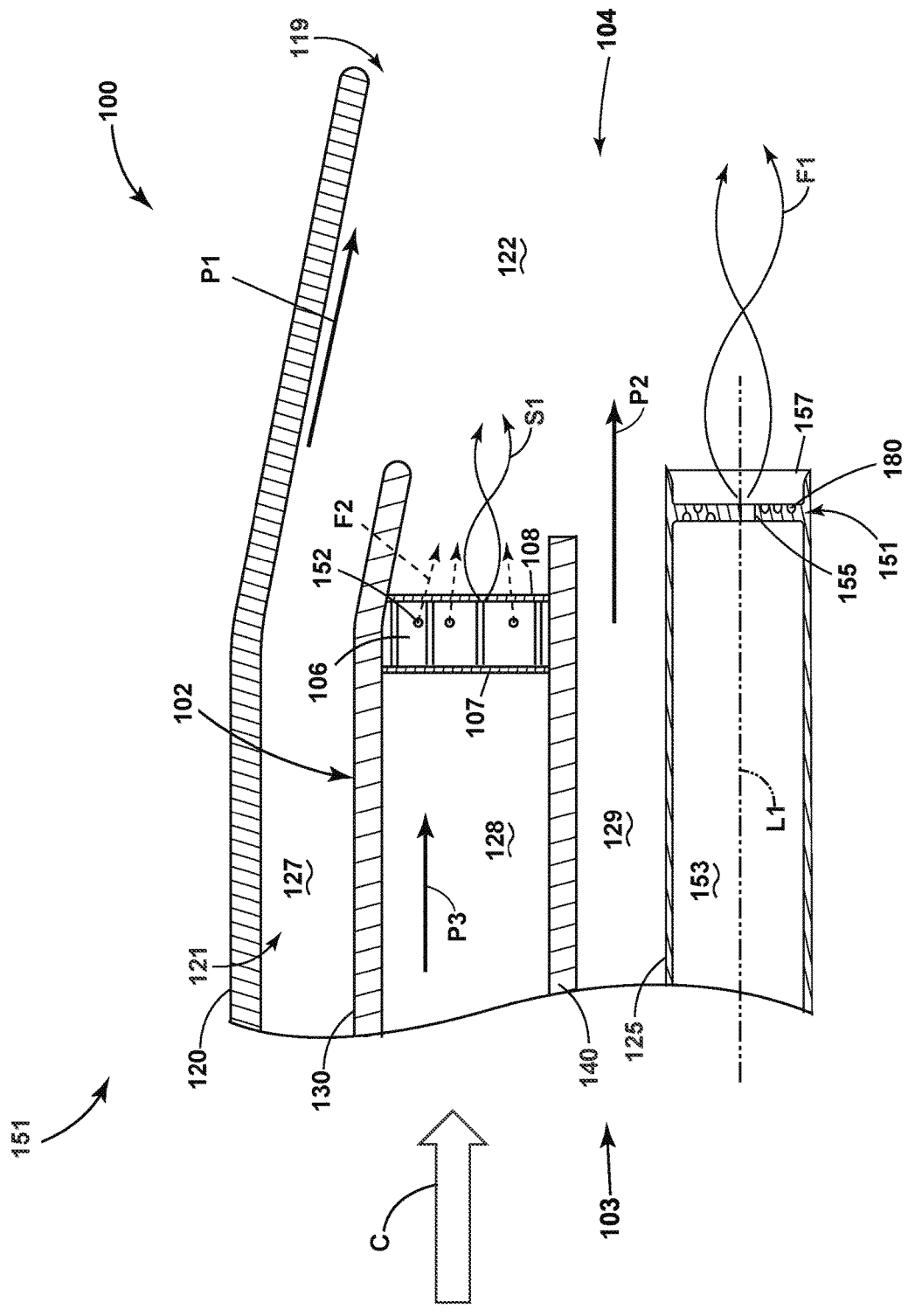
FIG. 4 is a cross-sectional view of a fuel premixer that can be utilized in the combustor of FIG. 3 in accordance with various aspects described herein.

A fuel premixer 100 can also be provided in the combustor 30. The fuel premixer 100 can form a mixture of fuel and air, and can also supply the mixture to the combustion chamber 50. Turning to FIG. 4, a cross-sectional view of the fuel premixer 100 is shown. The fuel premixer 100 can define an upstream end 103, a downstream end 104, and a central longitudinal axis L1 extending between the upstream end 103 and the downstream end 104. In some examples, the central longitudinal axis L1 can align with the longitudinal axis 52 (FIG. 3) though this need not be the case. It should be understood that only a portion of the fuel premixer 100 is shown in FIG. 4, and that the fuel premixer 100 can have an annular form about the central longitudinal axis L1.

The fuel premixer 100 can include an annular shroud 120 (or "shroud 120") defining an interior 121. The shroud 120 can define or circumscribe a mixing chamber 122 within the interior 121. A center body 125 can also be located within the interior 121. The center body 125 can also be aligned with the central longitudinal axis L1.

An annular swirler 102 having a set of vanes 106 can be located within the interior 121 and circumscribing the center body 125. Each vane in the set of vanes 106 can extend between an upstream leading edge 107 and a downstream trailing edge 108 as shown. The swirler 102 can include a first annular wall 130 and a second annular wall 140 as shown. The first annular wall 130 can be positioned radially outer from the second annular wall 140 with respect to the central longitudinal axis L1.

The swirler 102 can be spaced from the shroud 120. An outer annular passage, referred to herein as "first annular passage" 127, can be defined between the shroud 120 and the first annular wall 130 as shown. A second annular passage 128 can be defined within the swirler 102 between the first annular wall 130 and the second annular wall 140. The swirler 102 can also be spaced from the center body 125. An inner annular passage, referred to herein as "third annular passage" 129, can be defined between the second annular wall 140 and the center body 125 as shown.

A compressed airflow C can be provided to the fuel premixer 100. Portions of the compressed airflow C can be provided to corresponding portions of the fuel premixer 100. In the example shown, the compressed airflow C can include a first portion forming a first non-swirling airflow P1, a second portion forming a second non-swirling airflow P2, and a third portion forming a third non-swirling airflow P3. The first non-swirling airflow P1, the second non-swirling airflow P2, and the third non-swirling airflow P3 can be provided to the first annular passage 127, third annular passage 129, and second annular passage 128, respectively.

The fuel premixer 100 can further include at least a first fuel nozzle 151 and a set of second fuel nozzles 152. The first fuel nozzle 151 can be provided in the center body 125. The first fuel nozzle 151 can include a first fuel passage 153 and a nozzle outlet 157. In non-limiting aspects, the first fuel nozzle 151 can include a nozzle cap 155 defining a set of fuel orifices 180 therethrough. In such a case, the set of fuel orifices 180 can at least partially define the nozzle outlet 157.

The set of second fuel nozzles 152 can be circumferentially spaced or radially spaced from each other in some examples. In the non-limiting example shown, the set of second fuel nozzles 152 can be positioned the vanes 106 upstream of the trailing edge 108. It is contemplated that the set of second fuel nozzles 152 can inject fuel from the surfaces of the vanes 106. In some examples, the first fuel nozzle 151 can form a pilot while the main fuel supply for the combustor 30 (FIG. 3) can be supplied by the set of second fuel nozzles 152.

The shroud 120 can also define or circumscribe an exhaust flow passage 119 at the downstream end 104 of the fuel premixer 100. The exhaust flow passage 119 can be arranged having a converging cross-sectional profile at the downstream end 104. For example, the outer casing can include a converging portion at the downstream end 104 defining the exhaust flow passage 119. The exhaust flow passage 119 can be downstream of, and in fluid communication with, the first fuel nozzle 151, the set of second fuel nozzles 152, the first annular passage 127, the second annular passage 128, and the third annular passage 129.

During operation, the first fuel nozzle 151 can be configured to emit a first fuel flow F1 of received fuel to the exhaust flow passage 119. In some examples, the first fuel nozzle 151 can include angled or offset openings to form a swirling first fuel flow F1. While illustrated as a swirling flow, the first fuel flow F1 can also include a non-swirling flow in some examples. For example, the first fuel nozzle 151 can include openings aligned with the exhaust flow passage 119 such that the first fuel flow F1 does not swirl upon exit.

The set of second fuel nozzles 152 can be configured to emit a second fuel flow F2 of received fuel to the exhaust flow passage 119. In some examples, the set of second fuel nozzles 152 can include angled or offset openings to form a swirling second fuel flow F1. In other examples, the set of second fuel nozzles 152 can include straight openings, non-angled openings, or the like to form a non-swirling second fuel flow F1. While illustrated as a non-swirling flow, the second fuel flow F2 can also include a swirling flow, or combinations of swirling and non-swirling flows, in some examples.

In addition, in the example shown, the first fuel nozzle 151 can provide the first fuel flow F1 downstream of the swirler 102. Such an arrangement can prevent flame holding against the swirler 102 in some examples. In addition, the swirl created by the set of fuel orifices 180 on the nozzle cap 155 can prevent the occurrence of low-velocity flows at the first fuel nozzle 151, which reduces the opportunity for flame holding or flashback on the first fuel nozzle 151.

Furthermore, during operation, the first non-swirling airflow P1 can be conveyed through the first annular passage 127 to the exhaust flow passage 119. The first non-swirling airflow P1 can form a first air film located along the shroud 120, such as to provide cooling or to avoid flame holding in some examples. The third non-swirling airflow P3 can be conveyed to the second passage 128 and to the swirler 102. The swirler 102 can impart a tangential or helical swirl to the second non-swirling airflow P2 and emit a first swirling airflow S1 to be conveyed to the exhaust flow passage 119. The second non-swirling airflow P2 can be conveyed through the third annular passage 129 to the mixing chamber 122. The second non-swirling airflow P2 can create a second air film located along the center body 125, such as to provide cooling or to avoid flame holding in some examples. In this manner, a layered flow mixture of fuel and air can be provided to the exhaust flow passage 119 having the centrally-positioned swirling first fuel flow F1, the second non-swirling airflow P2 surrounding the first fuel flow F1, the first swirling air stream S1 mixed with second fuel flow F2 and surrounding the second non-swirling airflow P2, and with the non-swirling first airflow P1 forming an outermost layer along the shroud 120.

In this manner, the first non-swirling airflow P1 can be emitted from the outer first annular passage 127 into the mixing chamber 122 along the shroud 120, the second non-swirling airflow P2 can be emitted from the inner third annular passage 129 along the center body 125, the swirling airflow S1 can be emitted from the swirler 102 into the mixing chamber 122 between the first non-swirling airflow P1 and the second non-swirling airflow P2, and the swirling fuel flow F1 can be emitted from the center body 125 into the mixing chamber 122.

It can be appreciated that co-swirl among the streams of fuel and air can avoid high shear between the streams. Such shear reduction can reduce a shear layer deficit between the airflow and the fuel flow, providing for improved distribution for the radial velocity profile and maintaining a high axial velocity for both the fuel and the airflow. The high axial velocity can reduce or eliminate the occurrence of flame holding on the fuel premixer 100, permitting the use of higher temperature fuels, such as hydrogen fuels. Additionally, the co-swirling of the air and the fuel deters mixing of the air and fuel which provides for greater mixing control, as well as the reduction of or elimination of flashback and flame holding under high-temperature operations.

Figure 5:
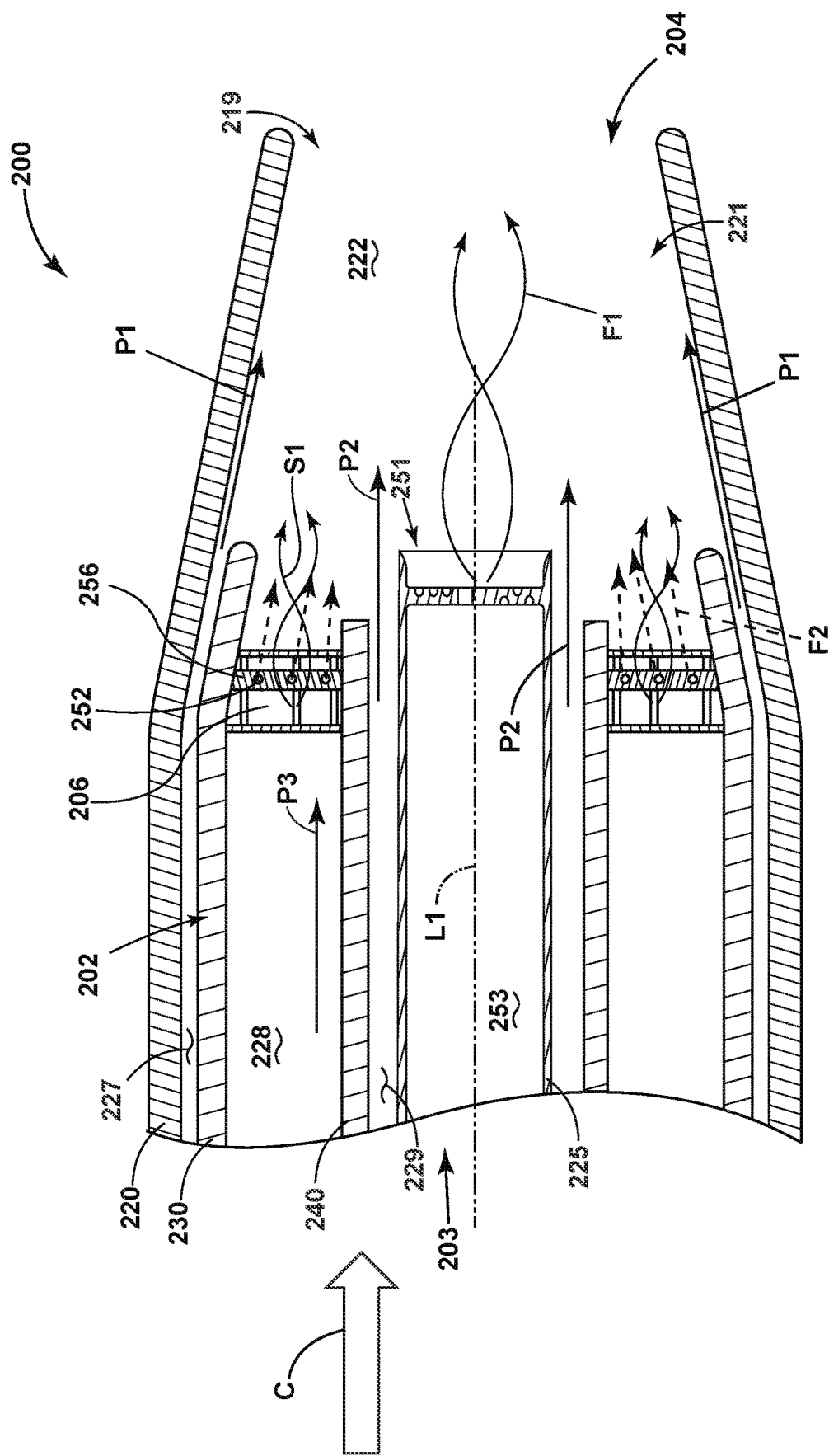
FIG. 5 is a cross-sectional view of another fuel premixer that can be utilized in the combustor of FIG. 3 in accordance with various aspects described herein.

Referring now to FIG. 5, another fuel premixer 200 is illustrated. The fuel premixer 200 is similar to the fuel premixer 100, therefore, like parts will be identified with like numerals increased by 100, with it being understood that the description of the like parts of the fuel premixer 100 applies to the fuel premixer 200, except where noted.

The fuel premixer 200 can define a shroud 220, an upstream end 203, a downstream end 204, a center body 225, an exhaust flow passage 219, and a central longitudinal axis L1. The shroud 220 can define an interior 221. The shroud 220 can define or circumscribe a mixing chamber 222 within the interior 221.

A swirler 202 having a set of vanes 206 can be provided in the fuel premixer 200. The swirler 202 can include a first annular wall 230 and a second annular wall 240. The swirler 202 can be spaced from the shroud 220 to define a first annular passage 227. A second annular passage 228 can be defined within the swirler 202. The swirler 202 can also be spaced from the center body 225 to define a third annular passage 229.

A compressed airflow C can be provided to the fuel premixer 200. The compressed airflow C can include a first non-swirling airflow P1, a second non-swirling airflow P2, and a third non-swirling airflow P3 provided to the first annular passage 227, third annular passage 229, and second annular passage 228, respectively. The shroud 220 can define or circumscribe the exhaust flow passage 219 at the downstream end 204 of the fuel premixer 200.

The fuel premixer 200 can further include at least a first fuel nozzle 251 and a set of second fuel nozzles 252. The first fuel nozzle 251 can be provided in the center body 225 and include a first fuel passage 253. The set of second fuel nozzles 252 can be circumferentially spaced or radially spaced from each other in some examples. One difference compared to the fuel premixer 100 is that the fuel premixer 200 can include a second fuel passage 256 fluidly coupled to the set of second fuel nozzles 252. The second fuel passage 256 can be communicatively coupled to a fuel source or fuel supply on the aircraft, for example, via a fuel line (not shown) to receive a flow of fuel therefrom from in a known manner, such as via a fuel pump (not shown). In non-limiting aspects, the second fuel passage 256 can define an annular shape. The second fuel passage 256 can comprise a tubular member. In some aspects, a portion of the second fuel passage 256 can be substantially concentric with the center body 225. The set of second fuel nozzles 252 can be further fluidly coupled to the second annular passage 228 and configured to supply the received fuel as a second fuel flow F2 to the second annular passage 228 and exhaust flow passage 122. In non-limiting aspects, each second fuel nozzles 252 can comprise a respective jet or nozzle.

During operation, the first fuel nozzle 251 can be configured to emit a first fuel flow F1 of received fuel to the exhaust flow passage 219. The set of second fuel nozzles 252 can be configured to emit a second fuel flow F2 of received fuel to the exhaust flow passage 219. The first non-swirling airflow P1 can be conveyed through the first annular passage 227 to the mixing chamber 222. The first non-swirling airflow P1 can form a first air film located along the shroud 220, such as to provide cooling or to avoid flame holding in some examples. The swirler 202 can impart a tangential or helical swirl to the third non-swirling airflow P3 and emit the first swirling air stream S1 to be conveyed to the exhaust flow passage 219. The second non-swirling airflow P2 can be conveyed through the third annular passage 229 to the mixing chamber 222. The second non-swirling airflow P2 can create a second air film located along the center body 225, such as to provide cooling or to avoid flame holding in some examples. In this manner, a layered flow mixture of fuel and air can be provided to the exhaust flow passage 219 having the centrally-positioned swirling first fuel flow F1, the second non-swirling airflow P2 surrounding the first fuel flow F1, the first swirling air stream S1 mixed with second fuel flow F2 and surrounding the second non-swirling airflow P2, and with the first non-swirling airflow P1 forming an outermost layer along the shroud 220.

Figure 6:
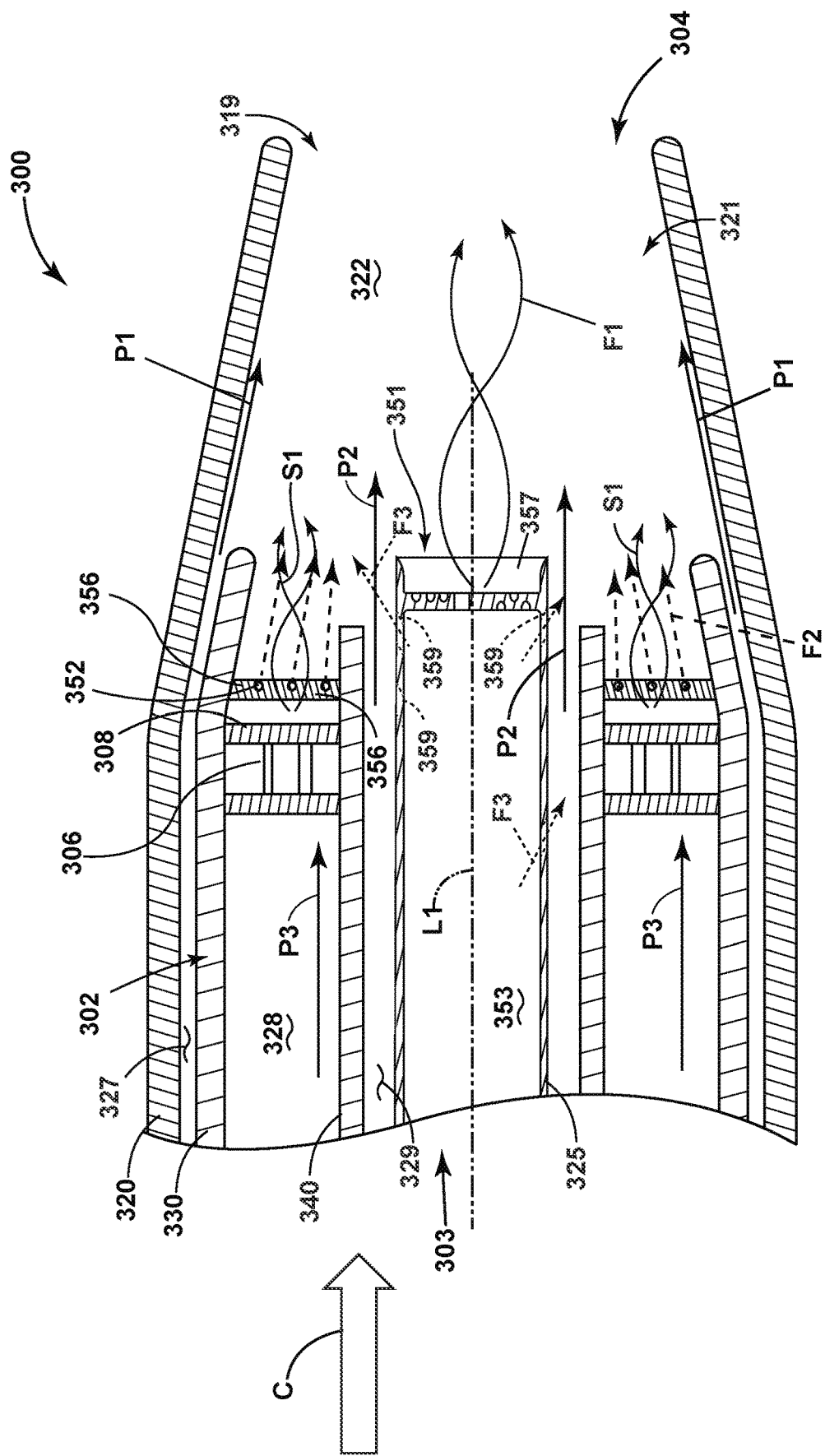
FIG. 6 is a cross-sectional view of another fuel premixer that can be utilized in the combustor of FIG. 3 in accordance with various aspects described herein.

Referring now to FIG. 6, another fuel premixer 300 is illustrated. The fuel premixer 300 is similar to the fuel premixer 100, 200, therefore, like parts will be identified with like numerals further increased by 100, with it being understood that the description of the like parts of the fuel premixer 100, 200 applies to the fuel premixer 300, except where noted.

The fuel premixer 300 can define a shroud 320, an upstream end 303, a downstream end 304, a center body 325, an exhaust flow passage 319, and a central longitudinal axis L1. The annular shroud 320 can define an interior 321. The shroud 320 can define or circumscribe a mixing chamber 322 within the interior 321.

A swirler 302 having a set of vanes 306 can be provided in the fuel premixer 300. The swirler 302 can include a first annular wall 330 and a second annular wall 340. The swirler 302 can be spaced from the shroud 320 to define a first annular passage 327. A second annular passage 328 can be defined within the swirler 302. The swirler 302 can also be spaced from the center body 325 to define a third annular passage 329.

A compressed airflow C can be provided to the fuel premixer 300. The compressed airflow C can include a first non-swirling airflow P1, a second non-swirling airflow P2, and a third non-swirling airflow P3 provided to the first annular passage 327, third annular passage 329, and second annular passage 328, respectively. The shroud 320 can define or circumscribe the exhaust flow passage 319 at the downstream end 304 of the fuel premixer 300.

The fuel premixer 300 can further include at least a first fuel nozzle 351 and a set of second fuel nozzles 352. The first fuel nozzle 351 can be provided in the center body 325 and include a first fuel passage 353 and a nozzle outlet 357. The set of second fuel nozzles 352 can be circumferentially spaced or radially spaced from each other, or combinations thereof, in some examples. A second fuel passage 356 can be provided in the fuel premixer 300 and fluidly coupled to the set of second fuel nozzles 352. One difference compared to the fuel premixer 100, 200 is that the second fuel passage 356 can be positioned downstream of a trailing edge 308 of the set of vanes 306.

Another difference compared to the fuel premixer 100, 200 is that the fuel premixer 300 can include one or more third fuel nozzles 359. The third fuel nozzles 359 can be arranged or defined on a periphery of the center body 325. The third fuel nozzles 359 can be positioned upstream of the nozzle outlet 357. For example, in non-limiting aspects, the third fuel nozzles 359 can be defined by apertures defined through the center body 325. The third fuel nozzles 359 can be axially spaced or circumferentially spaced from each other along the center body 325, in some non-limiting examples. The third fuel nozzles 359 can be in fluid communication with the first fuel passage 353 to receive fuel therefrom.

During operation, the first fuel nozzle 351 can be configured to emit a first fuel flow F1 of received fuel to the exhaust flow passage 319. The set of second fuel nozzles 352 can be configured to emit a second fuel flow F2 of received fuel to the exhaust flow passage 319. The first non-swirling airflow P1 can be conveyed through the first annular passage 327 to the exhaust flow passage 319. The first non-swirling airflow P1 can form a first air film located along the shroud 320, such as to provide cooling or to avoid flame holding in some examples. The swirler 302 can impart a tangential or helical swirl to the third non-swirling airflow P3 and emit the first swirling air stream S1 to be conveyed to the exhaust flow passage 319. The second non-swirling airflow P2 can be conveyed through the third annular passage 329 to the exhaust flow passage 319. The second non-swirling airflow P2 can create a second air film located along the center body 325, such as to provide cooling or to avoid flame holding in some examples.

In addition, during operation, the third fuel nozzles 359 can convey the received fuel as a third fuel flow F3 radially outward to the exhaust flow passage 319. The third fuel flow F3 can form a film on center body 325 and subsequently mix with the swirling first fuel flow F1. Such injection of the third fuel flow F3 upstream of the nozzle outlet 357, at the periphery of the center body 325, can provide additional time for fuel and air mixing prior to combustion while allowing at least a portion of the third fuel flow F3 to mix with air radially outward from the first fuel flow F1. Such an arrangement can enhance or increase the overall mixing and distribution of the fuel and air at the downstream end 304 of the fuel premixer 300. Such an improved mixing of fuel and air can result in reduced NO, emissions over conventional techniques.

A portion of the third fuel flow F3 can also flow on the outer diameter or periphery of the center body 325 and mix with fuel on the trailing edge of the center body 325, thereby creating a fuel-rich mixture on the trailing edge of the center body 325 to prevent flame holding on center body 325 trailing edge.

Figure 7:
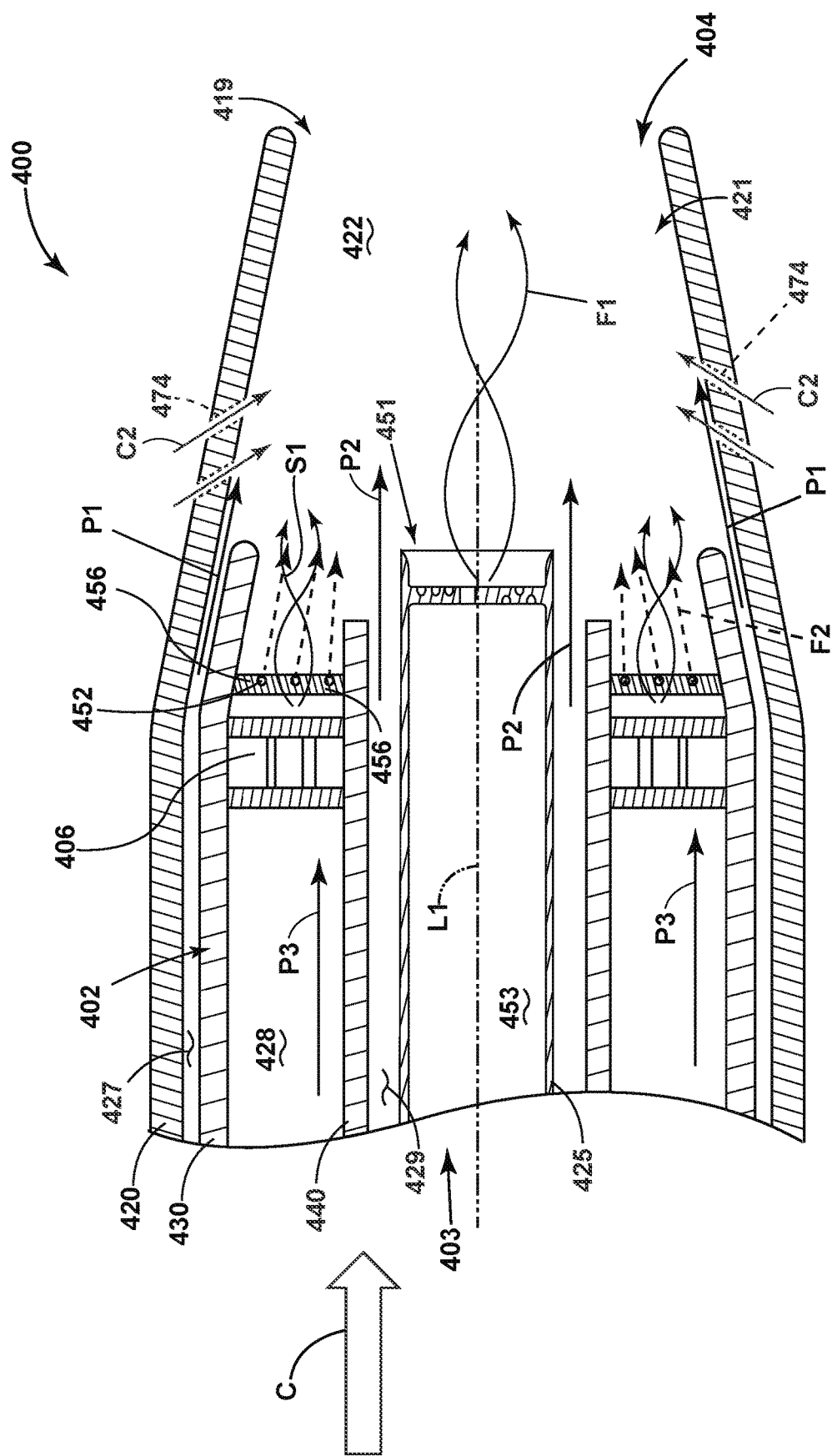
FIG. 7 is a cross-sectional view of another fuel premixer that can be utilized in the combustor of FIG. 3 in accordance with various aspects described herein.

Referring now to FIG. 7, another fuel premixer 400 is illustrated. The fuel premixer 400 is similar to the fuel premixer 100, 200, 300; therefore, like parts will be identified with like numerals further increased by 100, with it being understood that the description of the like parts of the fuel premixer 100, 200, 300 applies to the fuel premixer 400, except where noted.

The fuel premixer 400 can define a shroud 420, an upstream end 403, a downstream end 404, a center body 425, an exhaust flow passage 419, and a central longitudinal axis L1. The annular shroud 420 can define an interior 421. The shroud 420 can define or circumscribe a mixing chamber 422 within the interior 421.

A swirler 402 having a set of vanes 406 can be provided in the fuel premixer 400. The swirler 402 can include a first annular wall 430 and a second annular wall 440. The swirler 402 can be spaced from the shroud 420 to define a first annular passage 427. A second annular passage 428 can be defined within the swirler 402. The swirler 402 can also be spaced from the center body 425 to define a third annular passage 429.

A compressed airflow C can be provided to the fuel premixer 400. The compressed airflow C can include a first non-swirling airflow P1, a second non-swirling airflow P2, and a third non-swirling airflow P3 provided to the first annular passage 427, third annular passage 429, and second annular passage 428, respectively. The shroud 420 can define or circumscribe the exhaust flow passage 419 at the downstream end 404 of the fuel premixer 400.

The fuel premixer 400 can further include at least a first fuel nozzle 451 and a set of second fuel nozzles 452. The first fuel nozzle 451 can be provided in the center body 425 and include a first fuel passage 453. The set of second fuel nozzles 452 can be circumferentially spaced or radially spaced from each other in some examples. A second fuel passage 456 can be provided in the fuel premixer 400 and fluidly coupled to the set of second fuel nozzles 452. The second fuel passage 456 is illustrated as being positioned downstream of the set of vanes 406, though this need not be the case.

One difference compared to the fuel premixer 100, 200, 300 is that the fuel premixer 400 can include cooling apertures 474 defined through the shroud 420, in fluid communication with the exhaust flow passage 419. The cooling apertures 474 can be disposed axially downstream of the first fuel nozzle 451 and the set of second fuel nozzles 452. Some exemplary cooling apertures 474 are illustrated, and any number of cooling apertures 474 can be provided. The cooling apertures 474 can be circumferentially spaced from each other. Additionally, or alternatively, the cooling apertures 474 can be axially spaced from each other. In non-limiting aspects, the cooling apertures 474 can include a tangential or compound angle component. In operation, the cooling apertures 474 can provide a respective second airflow C2 to the exhaust flow passage 419. The second airflow C2 can be separate from the compressed airflow C in some examples. The second airflow C2 can also be a portion of the compressed airflow C in some examples.

During operation, the first fuel nozzle 451 can be configured to emit a first fuel flow F1 of received fuel to the exhaust flow passage 419. The set of second fuel nozzles 452 can be configured to emit a second fuel flow F2 of received fuel to the exhaust flow passage 419. The first non-swirling airflow P1 can be conveyed through the first annular passage 427 to the exhaust flow passage 419. The first non-swirling airflow P1 can form a first air film located along the shroud 420, such as to provide cooling or to avoid flame holding in some examples. The swirler 402 can impart a tangential or helical swirl to the third non-swirling airflow P3 and emit the first swirling air stream S1 to be conveyed to the exhaust flow passage 419. The second non-swirling airflow P2 can be conveyed through the third annular passage 428 to the exhaust flow passage 419. The second non-swirling airflow P2 can create a second air film located along the center body 425, such as to provide cooling or to avoid flame holding in some examples.

In addition, during operation, the cooling apertures 474 can emit the second airflow C2 such that the second airflow C2 can form or enhance the first air film along the shroud 420. Such an arrangement can further prevent or reduce flame holding along the shroud 420.

Figure 8:
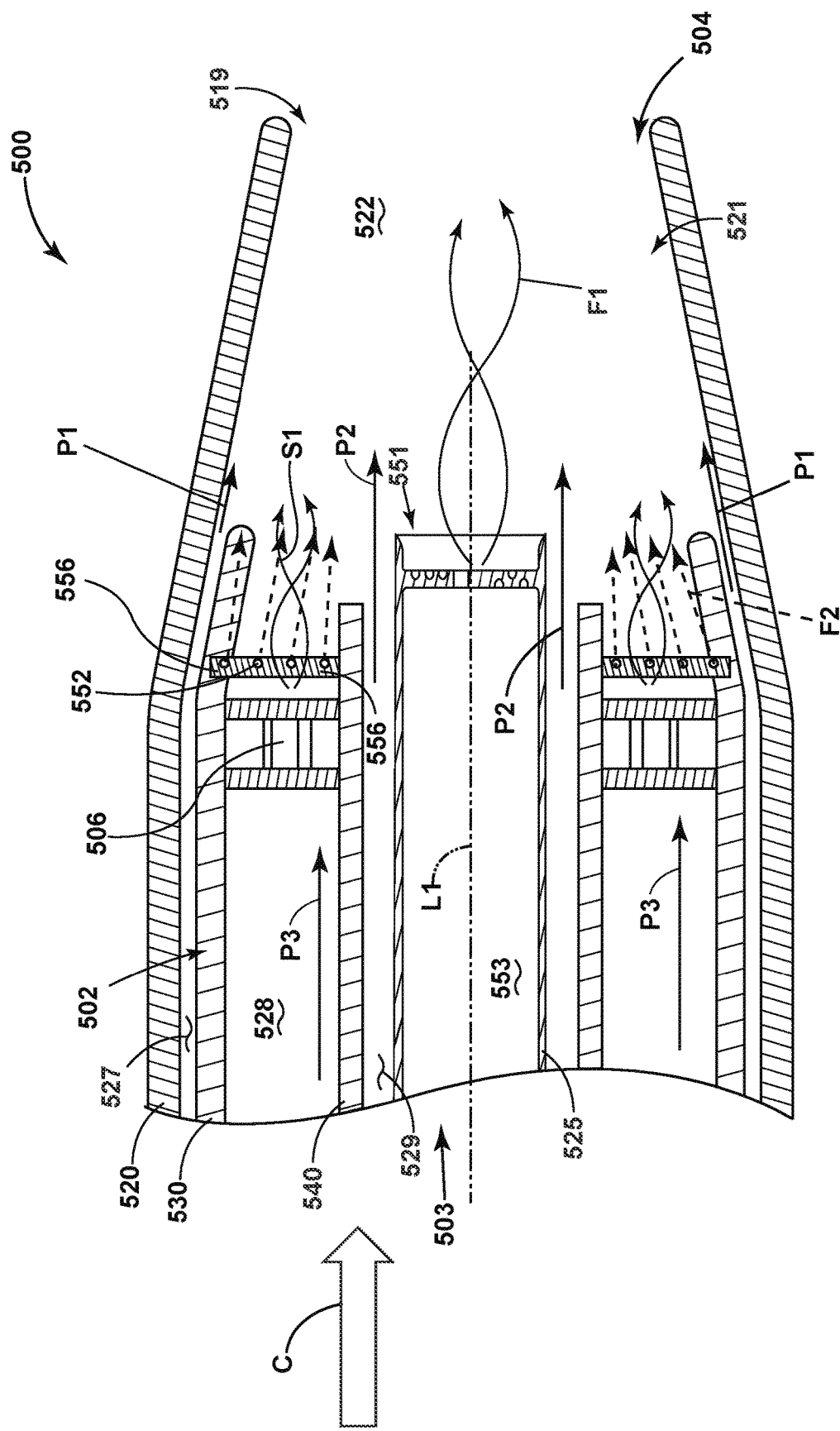
FIG. 8 is a cross-sectional view of another fuel premixer that can be utilized in the combustor of FIG. 3 in accordance with various aspects described herein.

Referring now to FIG. 8, another fuel premixer 500 is illustrated. The fuel premixer 500 is similar to the fuel premixer 100, 200, 300, 400; therefore, like parts will be identified with like numerals further increased by 100, with it being understood that the description of the like parts of the fuel premixer 100, 200, 300, 400 applies to the fuel premixer 500, except where noted.

The fuel premixer 500 can define a shroud 520, an upstream end 503, a downstream end 504, a center body 525, an exhaust flow passage 519, and a central longitudinal axis L1. The shroud 520 can define an interior 521. The shroud 520 can define or circumscribe a mixing chamber 522 within the interior 521.

A swirler 502 having a set of vanes 506 can be provided in the fuel premixer 500. The swirler 502 can include a first annular wall 530 and a second annular wall 540. The swirler 502 can be spaced from the shroud 520 to define a first annular passage 527. A second annular passage 528 can be defined within the swirler 502. The swirler 502 can also be spaced from the center body 525 to define a third annular passage 529.

A compressed airflow C can be provided to the fuel premixer 500. The compressed airflow C can include a first non-swirling airflow P1, a second non-swirling airflow P2, and a third non-swirling airflow P3 provided to the first annular passage 527, third annular passage 529, and second annular passage 528, respectively. The shroud 520 can define or circumscribe an exhaust flow passage 119 at the downstream end 104 of the fuel premixer 100.

The fuel premixer 500 can further include at least a first fuel nozzle 551 and a set of second fuel nozzles 552. The first fuel nozzle 551 can be provided in the center body 525 and include a first fuel passage 553. The set of second fuel nozzles 552 can be circumferentially spaced or radially spaced from each other in some examples. A second fuel passage 556 can be provided in the fuel premixer 500 and fluidly coupled to the set of second fuel nozzles 552. The second fuel passage 556 is illustrated as being positioned downstream of the set of vanes 506, though this need not be the case.

One difference compared to the fuel premixer 100, 200, 300, 400 is that a portion of the second fuel passage 556, or at least a subset of second fuel nozzles 552, or both, can extend radially outward outside of the second annular passage 528. Put another way, at least a portion of the subset of the second fuel nozzles 552 can be disposed outside of the swirling air stream S1. In this manner, at least a portion of the second fuel flow F2 can be at least initially conveyed outside of the swirling air stream SL. This portion of the second fuel flow F2 can be injected or conveyed from the first annular wall 530, including toward the swirling air stream S1, or parallel to the swirling air stream S1, in some non-limiting examples. In non-limiting aspects the at least a portion of the subset of the second fuel nozzles 552 can be arranged upstream of the first fuel nozzle 551. Injecting a portion of the second fuel flow F2 radially outward relative to the remaining portion of the second fuel flow F2 can distribute the second fuel flow F2 over a relatively larger radial span to achieve improved fuel-air mixing and better radial distribution of fuel profiles at an exit of exhaust flow passage 519 compared to conventional techniques. It will be appreciated that an improved mixing of fuel and air can result in reduced $NO_x$ emissions over conventional techniques. In some non-limiting aspects, the portion of the second fuel flow F2 can be injected from the first annular wall 530.

In still other non-limiting aspects, the portion of the second fuel flow F2 can be injected from the set of second fuel nozzles 552 to thereby form a radial spread of fuel to achieve better fuel-air mixing resulting in lower NO, emission over conventional techniques. In some non-limiting aspects, the second fuel nozzles 552 can be circumferentially or axially staggered with respect to each other to either achieve increased circumferential spread of fuel or obtain a predetermined fuel-air mixing length, or both.

Figure 9:
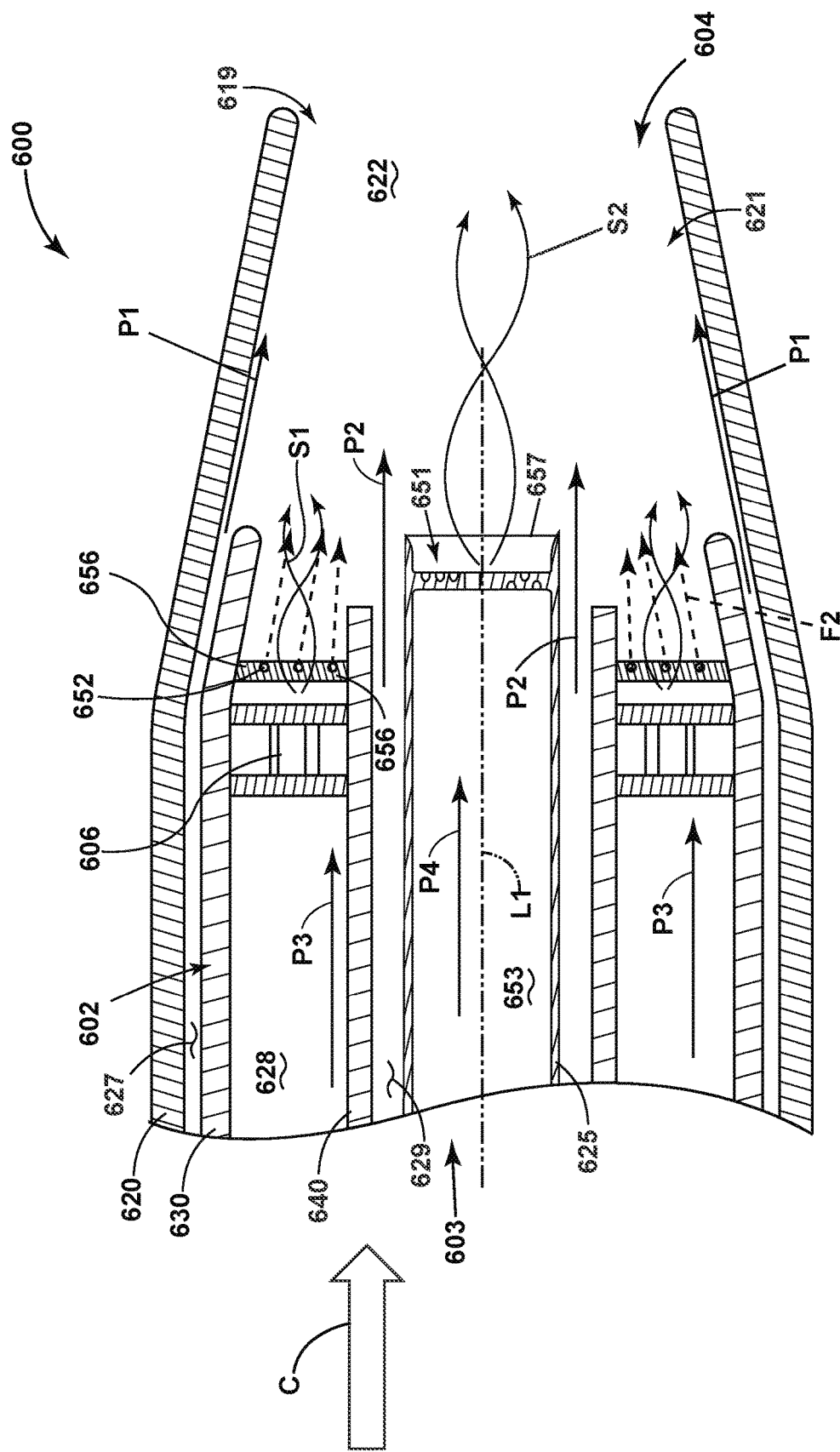
FIG. 9 is a cross-sectional view of another fuel premixer that can be utilized in the combustor of FIG. 3 in accordance with various aspects described herein.

Referring now to FIG. 9, another fuel premixer 600 is illustrated. The fuel premixer 500 is similar to the fuel premixer 100, 200, 300, 400, 500; therefore, like parts will be identified with like numerals further increased by 100, with it being understood that the description of the like parts of the fuel premixer 100, 200, 300, 400, 500 applies to the fuel premixer 600, except where noted.

The fuel premixer 600 can define a shroud 620, an upstream end 603, a downstream end 604, a center body 625, an exhaust flow passage 619, and a central longitudinal axis L1. The annular shroud 620 can define an interior 621. The shroud 620 can define or circumscribe a mixing chamber 622 within the interior 621.

A swirler 602 having a set of vanes 606 can be provided in the fuel premixer 600. The swirler 602 can include a first annular wall 630 and a second annular wall 640. The swirler 602 can be spaced from the shroud 620 to define a first annular passage 627. A second annular passage 628 can be defined within the swirler 602. The swirler 602 can also be spaced from the center body 625 to define a third annular passage 629.

A compressed airflow C can be provided to the fuel premixer 600. The compressed airflow C can include a first non-swirling airflow P1, a second non-swirling airflow P2, and a third non-swirling airflow P3 provided to the first annular passage 627, third annular passage 629, and second annular passage 628, respectively. The shroud 620 can define or circumscribe the exhaust flow passage 619 at the downstream end 604 of the fuel premixer 600.

The fuel premixer 600 can further include at least a first fuel nozzle 651 and a set of second fuel nozzles 652. The first fuel nozzle 651 can be provided in the center body 625 and include a first fuel passage 653. The set of second fuel nozzles 652 can be circumferentially spaced or radially spaced from each other in some examples. A second fuel passage 656 can be provided in the fuel premixer 600 and fluidly coupled to the set of second fuel nozzles 652. The second fuel passage 656 is illustrated as being positioned downstream of the set of vanes 606, though this need not be the case.

One difference compared to the fuel premixer 100, 200, 300, 400, 500, is that the first fuel passage 653 can receive a fourth portion of the compressed airflow C as a fourth non-swirling airflow P4, instead of a supply of fuel. In this manner the first fuel passage 653 can be configured to supply air alone, fuel alone, or a mixture of air and fuel, to the mixing chamber 622.

During operation, the set of second fuel nozzles 652 can be configured to emit a second fuel flow F2 of received fuel to the exhaust flow passage 619. The first non-swirling airflow P1 can be conveyed through the first annular passage 627 to the exhaust flow passage 619. The first non-swirling airflow P1 can form a first air film located along the shroud 620, such as to provide cooling or to avoid flame holding in some examples. The swirler 602 can impart a tangential or helical swirl to the third non-swirling airflow P3 and emit the first swirling air stream S1 to be conveyed to the exhaust flow passage 619. The second non-swirling airflow P2 can be conveyed through the third annular passage 629 to the exhaust flow passage 619. The second non-swirling airflow P2 can create a second air film located along the center body 625, such as to provide cooling or to avoid flame holding in some examples.

In addition, during operation, the fourth non-swirling airflow P4 can be conveyed to a nozzle outlet 657 as a second swirling airflow S2. In non-limiting aspects, the third non-swirling airflow P3 can be disposed radially outward from the second swirling airflow S2. In this sense, the second swirling airflow S2 can be surrounded by the third non-swirling airflow P3. In operation, this arrangement can have the effect of biasing fuel away from central region of the exhaust flow passage 619 thereby resulting in a reduction or an elimination of center body flame holding.

Figure 10:
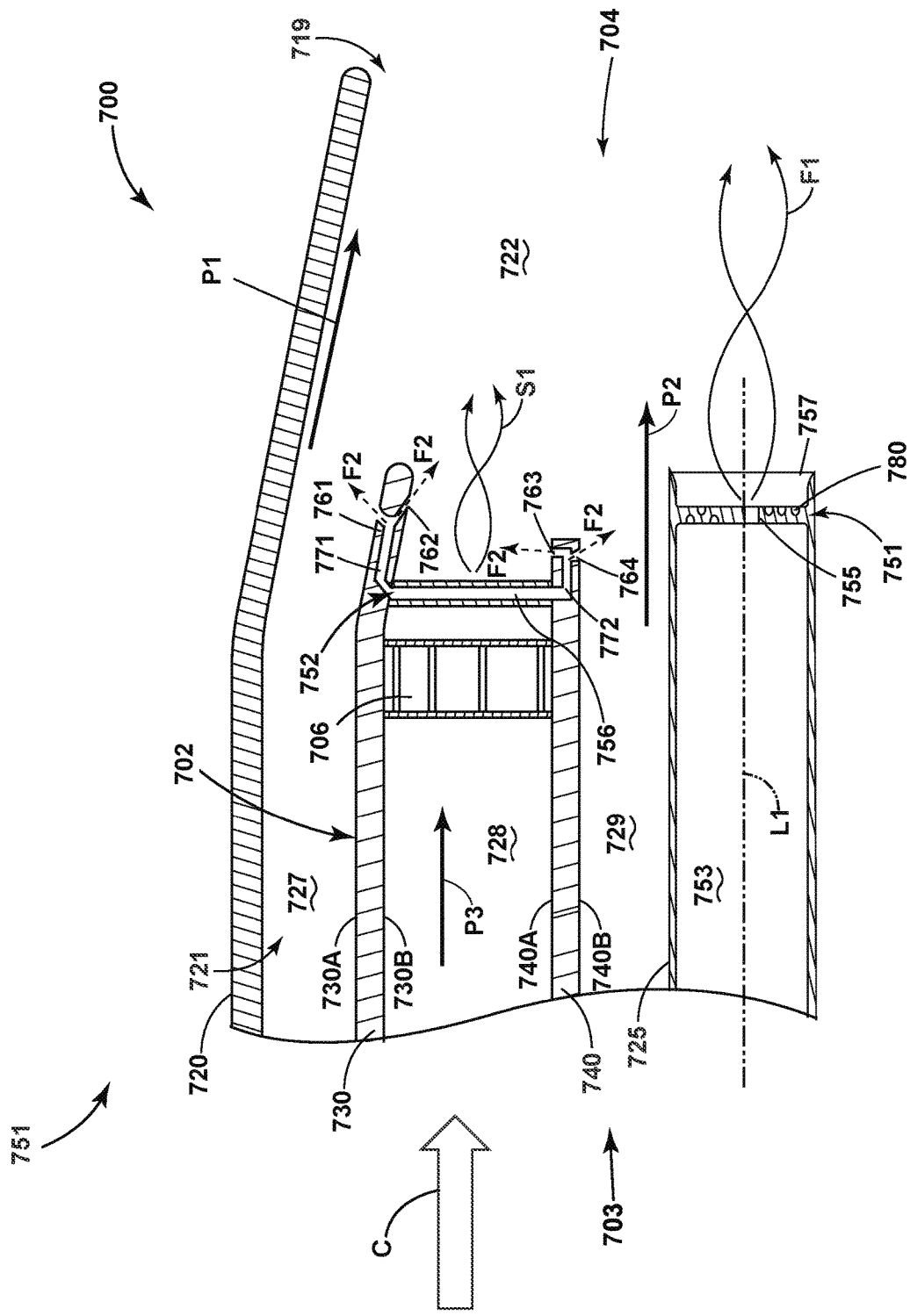
FIG. 10 is a cross-sectional view of another fuel premixer that can be utilized in the combustor of FIG. 3 in accordance with various aspects described herein.

Referring now to FIG. 10, another fuel premixer 700 is illustrated. The fuel premixer 500 is similar to the fuel premixer 100, 200, 300, 400, 500, 600; therefore, like parts will be identified with like numerals further increased by 100, with it being understood that the description of the like parts of the fuel premixer 100, 200, 300, 400, 500, 600 applies to the fuel premixer 700, except where noted.

The fuel premixer 700 can define a shroud 720, an upstream end 703, a downstream end 704, a center body 725, an exhaust flow passage 719, and a central longitudinal axis L1. The annular shroud 720 can define an interior 721. The shroud 720 can define or circumscribe a mixing chamber 722 within the interior 721.

A swirler 702 having a set of vanes 706 can be provided in the fuel premixer 700. The swirler 702 can include a first annular wall 730 and a second annular wall 740. The swirler 702 can be spaced from the shroud 720 to define a first annular passage 727. A second annular passage 728 can be defined within the swirler 702. The swirler 702 can also be spaced from the center body 725 to define a third annular passage 729.

A compressed airflow C can be provided to the fuel premixer 7M). The compressed airflow C can include a first non-swirling airflow P1, a second non-swirling airflow P2, and a third non-swirling airflow P3 that can be provided to the first annular passage 727, third annular passage 729, and second annular passage 728, respectively. The shroud 720 can define or circumscribe the exhaust flow passage 719 at the downstream end 704 of the fuel premixer 700.

The fuel premixer 700 can further include a first fuel nozzle 751 and a set of second fuel nozzles 752. The first fuel nozzle 751 can be provided in the center body 725 and include a first fuel passage 753. The first fuel nozzle 751 can further include a nozzle outlet 757. In non-limiting aspects, the first fuel nozzle 751 can include a nozzle cap 755 defining a set of fuel orifices 780 therethrough. In such a case, the set of fuel orifices 780 can at least partially define the nozzle outlet 757.

A second fuel passage 756 can be provided in the fuel premixer 700. The second fuel passage 756 is illustrated as a separate fuel conduit positioned downstream of the set of vanes 706, though this need not be the case. The second fuel passage 756 and set of second fuel nozzles 752 can be provided in the set of vanes 706, or by way of multiple discrete fuel conduits, or combinations thereof, in some non-limiting examples. In addition, the set of second fuel nozzles 752 can be fluidly coupled to the second fuel passage 756.

One difference compared to the fuel premixer 100, 200, 300, 400, 500, 600 is that either or both of the first annular wall 730 or second annular wall 740 can include an internal passage fluidly coupled to the second fuel passage 756. In the non-limiting example shown, the first annular wall 730 can include a first wall passage 771 and the second annular wall 740 can include a second wall passage 772. Either or both of the first wall passage 771 or second wall passage 772 can include straight portions, curved portions, branching portions, or the like.

Another difference compared to the fuel premixer 100, 200, 300, 400, 500, 600 is that the set of second fuel nozzles 752 can include outlets on either or both of the first annular wall 730 or second annular wall 740. In the non-limiting example shown, the set of second fuel nozzles 752 can include a first outlet 761 on a first side 730A of the first annular wall 730, a second outlet 762 on a second side 730B of the first annular wall 730, a third outlet 763 on a first side 740A of the second annular wall 740, and a fourth outlet 764 on a second side 740B of the second annular wall 740. Any number of outlets can be provided in the set of second fuel nozzles 752.

In addition, in the non-limiting example shown, the first wall passage 771 can extend from the second fuel passage 756 to the first outlet 761 and second outlet 762. The second wall passage 772 can extend from the second fuel passage 756 to the third outlet 763 and fourth outlet 764.

During operation, the first fuel nozzle 751 can be configured to emit a first fuel flow F1 of received fuel to the exhaust flow passage 719. While illustrated as a swirling flow, the first fuel flow F1 can also include a non-swirling flow in some examples. In addition, in the example shown, the first fuel nozzle 751 can provide the first fuel flow F1 downstream of the swirler 702. Such an arrangement can prevent flame holding against the swirler 102 in some examples. In addition, the swirl created by the set of fuel orifices 780 on the nozzle cap 755 can prevent the occurrence of low-velocity flows at the first fuel nozzle 751, which reduces the opportunity for flame holding or flashback on the first fuel nozzle 751.

The first non-swirling airflow P1 can be conveyed through the first annular passage 727 to the exhaust flow passage 719. The first non-swirling airflow P1 can form a first air film located along the shroud 720, such as to provide cooling or to avoid flame holding in some examples. The third non-swirling airflow P3 can be conveyed to the second passage 728 and to the swirler 702. The swirler 702 can impart a tangential or helical swirl to the third non-swirling airflow P3 and emit a first swirling airflow S1 to be conveyed to the exhaust flow passage 719. The second non-swirling airflow P2 can be conveyed through the third annular passage 729 to the mixing chamber 722. The second non-swirling airflow P2 can create a second air film located along the center body 725, such as to provide cooling or to avoid flame holding in some examples.

In addition, during operation, the set of second fuel nozzles 752 can be configured to emit a second fuel flow F2 of received fuel. While illustrated as a non-swirling flow, the second fuel flow F2 can also include a swirling flow in some examples. The second fuel flow F2 can be emitted into any or all of the first annular passage 727, second annular passage 728, or third annular passage 729. The second fuel flow F2 can be divided equally or non-equally among the set of second fuel nozzles 752. In this manner, the set of second fuel nozzles 752 can provide a secondary fuel circuit injecting fuel into any or all of the first non-swirling airflow P1, third non-swirling airflow P3, or first swirling airflow S1 during operation.

The features included herein provide for improved fuel supply to a turbine engine combustor, which provides for reducing or eliminating flame holding or flashback at a fuel premixer. Such reduction or elimination provides for the use of higher temperature fuels, such as hydrogen fuels, which provide for improving efficiency while reducing or eliminating emissions.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

Further aspects of the disclosure are provided in the following clauses.

A turbine engine, comprising a compressor section, a combustion section, and a turbine section in serial flow arrangement, and the combustion section having a combustor with a fuel premixer comprising an annular shroud defining an interior with a mixing chamber, a center body located within the interior and having a first fuel nozzle emitting fuel into the mixing chamber, and an annular swirler located within the interior, circumscribing the center body, with the annular swirler spaced from the shroud to define an outer annular passage, and also spaced from the center body to define an inner annular passage, wherein: the outer annular passage is configured to emit a first non-swirling airflow into the mixing chamber as a first air film located along the shroud, the inner annular passage is configured to emit a second non-swirling airflow into the mixing chamber as a second air film located along the center body, the annular swirler is configured to emit a swirling airflow into the mixing chamber between the first non-swirling airflow and the second non-swirling airflow, and the first fuel nozzle is configured to emit a swirling fuel flow into the mixing chamber.

The turbine engine of any preceding clause, further comprising a set of second fuel nozzles configured to emit a second fuel flow into the swirling airflow.

The turbine engine of any preceding clause, further comprising a second fuel passage located within the interior and fluidly coupled to the set of second fuel nozzles.

The turbine engine of any preceding clause, wherein the annular swirler comprises a set of vanes, with the set of second fuel nozzles positioned on the set of vanes.

The turbine engine of any preceding clause, wherein the set of vanes comprises a trailing edge, with the second fuel passage located one of downstream or upstream of the trailing edge.

The turbine engine of any preceding clause, wherein the second fuel passage extends to at least one outlet on at least one wall of the annular swirler, with the at least one outlet fluidly coupling the second fuel passage to at least one of the inner annular passage or the outer annular passage.

The turbine engine of any preceding clause, wherein the second fuel passage extends into a wall of the annular swirler, with the set of second fuel nozzles configured to emit the second fuel flow outside of the annular swirler.

The turbine engine of any preceding clause, wherein the center body comprises a nozzle cap and a set of fuel orifices in the nozzle cap configured to emit the swirling fuel flow.

The turbine engine of any preceding clause, further comprising a third fuel nozzle in the center body fluidly coupling a first fuel passage in the first fuel nozzle to the inner annular passage.

The turbine engine of any preceding clause, further comprising a cooling aperture in the shroud downstream of the annular swirler and fluidly coupled to the mixing chamber.

A combustor for a turbine engine, comprising: a combustor liner at least partially defining a combustion chamber, and a fuel premixer fluidly coupled to the combustion chamber and comprising: an annular shroud defining an interior with a mixing chamber, a center body located within the interior and having a first fuel nozzle, and an annular swirler located within the interior, circumscribing the center body, with the annular swirler spaced from the shroud to define an outer annular passage, and also spaced from the center body to define an inner annular passage, wherein: the outer annular passage is configured to emit a first non-swirling airflow into the mixing chamber as a first air film along the shroud, the inner annular passage is configured to emit a second non-swirling airflow into the mixing chamber as a second air film located along the center body, the annular swirler is configured to emit a swirling airflow into the mixing chamber between the first non-swirling airflow and the second non-swirling airflow, and the first fuel nozzle is configured to emit at least one of a flow of fuel or a flow of air into the mixing chamber.

The combustor of any preceding clause, further comprising a set of second fuel nozzles configured to emit a second flow of fuel into the swirling airflow.

The combustor of any preceding clause, wherein the annular swirler comprises a set of vanes, with the set of second fuel nozzles positioned on the set of vanes.

The combustor of any preceding clause, further comprising a second fuel passage located within the interior and having the set of second fuel nozzles.

A method of mixing fuel in a combustor of a turbine engine, the method comprising emitting a first non-swirling airflow into a mixing chamber within the combustor, emitting a second non-swirling airflow into the mixing chamber and spaced from the first non-swirling airflow, emitting a first swirling airflow into the mixing chamber between the first non-swirling airflow and the second non-swirling airflow, and emitting a first flow of fuel into the combustor adjacent the second non-swirling airflow.

The method of any preceding clause, wherein the first flow of fuel is swirling.

The method of any preceding clause, further comprising emitting a second flow of fuel into the first swirling airflow.

The method of any preceding clause, wherein the second flow of fuel is non-swirling.

The method of any preceding clause, wherein the second flow of fuel is emitted from at least one vane of a swirler.

The method of any preceding clause, wherein the second flow of fuel is emitted from fuel orifices upstream of a trailing edge of the at least one vane.

A combustor for a turbine engine, comprising a combustor liner at least partially defining a combustion chamber, and a fuel premixer fluidly coupled to the combustion chamber and comprising an annular shroud defining an interior with a mixing chamber, a center body located within the interior and having a first fuel nozzle emitting fuel into the mixing chamber, and an annular swirler located within the interior, circumscribing the center body, with the swirler spaced from the shroud to define an outer annular passage, and also spaced from the center body to define an inner annular passage, wherein the outer annular passage is configured to emit a first non-swirling airflow into the mixing chamber as a first air film located along the shroud, the inner annular passage is configured to emit a second non-swirling airflow into the mixing chamber as a second air film located along the center body, the swirler is configured to emit a swirling airflow into the mixing chamber between the first non-swirling airflow and the second non-swirling airflow, and the first fuel nozzle is configured to emit at least one of a flow of fuel or a flow of air into the mixing chamber.

The combustor of any preceding clause, further comprising a second fuel nozzle configured to emit a second flow of fuel into the swirling airflow.

The combustor of any preceding clause, wherein the annular swirler comprises a set of vanes, with the set of second fuel nozzles positioned on the set of vanes.

The combustor of any preceding clause, further comprising a second fuel passage located within the interior and having the second fuel nozzle.

The combustor of any preceding clause, wherein the second fuel passage extends to at least one outlet on at least one wall of the annular swirler, with the at least one outlet fluidly coupling the second fuel passage to at least one of the inner annular passage or the outer annular passage.

The combustor of any preceding clause, wherein the first fuel nozzle is configured to emit the flow of air into the mixing chamber as a second swirling airflow.

The combustor of any preceding clause, wherein the second fuel nozzle is configured to emit the second flow of fuel into the first swirling airflow.

A method of mixing fuel in a combustor of a turbine engine, the method comprising emitting a first non-swirling airflow into a mixing chamber within the combustor, emitting a second non-swirling airflow into the mixing chamber and spaced from the first non-swirling airflow, emitting a first swirling airflow into the mixing chamber between the first non-swirling airflow and the second non-swirling airflow, and emitting a first flow of fuel into the combustor adjacent the second non-swirling airflow.

The method of any preceding clause, wherein the first flow of fuel is swirling.

The method of any preceding clause, further comprising emitting a second flow of fuel into the first swirling airflow.

The method of any preceding clause, wherein the second flow of fuel is non-swirling.

The method of any preceding clause, wherein the second flow of fuel is emitted from at least one vane of a swirler.

The method of any preceding clause, wherein the second flow of fuel is emitted from fuel orifices upstream of a trailing edge of the at least one vane.

A turbine engine, comprising a compressor section, a combustion section, and a turbine section in serial flow arrangement, and the combustion section having a combustor with a fuel premixer comprising an annular shroud defining an interior with a mixing chamber, a center body located within the interior and having a first fuel nozzle emitting fuel into the mixing chamber, an annular swirler located within the interior, circumscribing the center body, an outer annular passage defined between the annular swirler and the annular shroud, and an inner annular passage defined between the center body and the annular swirler.

The turbine engine of any preceding clause, further comprising a first non-swirling airflow emitted from the outer annular passage into the mixing chamber and forming a first air film located along the shroud.

The turbine engine of any preceding clause, further comprising a second non-swirling airflow emitted from the inner annular passage into the mixing chamber and forming a second air film located along the center body.

The turbine engine of any preceding clause, further comprising a swirling airflow emitted from the annular swirler into the mixing chamber between the first non-swirling airflow and the second non-swirling airflow.

The turbine engine of any preceding clause, further comprising a third non-swirling airflow flowing through the annular swirler and forming the swirling airflow.

The turbine engine of any preceding clause, further comprising a swirling fuel flow emitted from the first fuel nozzle into the mixing chamber.

The turbine engine of any preceding clause, further comprising a second swirling airflow emitted from the first fuel nozzle into the mixing chamber.

What is claimed is:

1. A turbine engine, comprising:
   a compressor section, a combustion section, and a turbine section in serial flow arrangement;
   a combustor in the combustion section having a combustion chamber; and
   a fuel injector configured to deliver a mixture of air and fuel to the combustor, the fuel injector comprising:
      a fuel premixer fluidly coupled to the combustion chamber and comprising:
         an annular shroud defining an interior with a mixing chamber;
         a center body located within the interior and having a first fuel nozzle configured to emit a swirling fuel flow into the mixing chamber; and
         an annular swirler located within the interior, the annular swirler having a first annular wall proximate the annular shroud and circumscribing the center body, the annular swirler having a second annular wall proximate the center body and circumscribing the center body,
         an outer annular passage defined between the first annular wall of the annular swirler and the annular shroud, wherein the outer annular passage is configured to emit a first non-swirling airflow into the mixing chamber as a first air film located along the annular shroud;
         an inner annular passage defined between the second annular wall of the annular swirler and the center body,
         wherein the inner annular passage is configured to emit a second non-swirling airflow into the mixing chamber as a second air film located along the center body; and
         wherein the annular swirler is configured to emit a swirling airflow into the mixing chamber between the first non-swirling airflow and the second non-swirling airflow.

2. The turbine engine of claim 1, further comprising a set of second fuel nozzles configured to emit a second fuel flow into the swirling airflow.

3. The turbine engine of claim 2, further comprising a second fuel passage located within the interior and fluidly coupled to the set of second fuel nozzles.

4. The turbine engine of claim 3, wherein the annular swirler comprises a set of vanes, with the set of second fuel nozzles positioned on the set of vanes.

5. The turbine engine of claim 4, wherein the set of vanes comprises a trailing edge, with the second fuel passage located one of downstream or upstream of the trailing edge.

6. The turbine engine of claim 3, wherein the second fuel passage extends to at least one outlet on at least one wall of the first annular wall and the second annular wall of the annular swirler, with the at least one outlet fluidly coupling the second fuel passage to at least one of the inner annular passage or the outer annular passage.

7. The turbine engine of claim 3, wherein the second fuel passage extends into a wall of the first annular wall or the second annular wall of the annular swirler, with the set of second fuel nozzles configured to emit the second fuel flow outside of the annular swirler.

8. The turbine engine of claim 1, wherein the center body comprises a nozzle cap and a set of fuel orifices in the nozzle cap configured to emit the swirling fuel flow.

9. The turbine engine of claim 1, further comprising a third fuel nozzle in the center body fluidly coupling a first fuel passage in the first fuel nozzle to the inner annular passage.

10. The turbine engine of claim 1, further comprising a cooling aperture in the annular shroud downstream of the annular swirler and fluidly coupled to the mixing chamber.

11. A combustor for a turbine engine, comprising:
    a combustor liner at least partially defining a combustion chamber; and
    a fuel injector configured to deliver a mixture of air and fuel to the combustor, the fuel injector comprising:
       a fuel premixer fluidly coupled to the combustion chamber and comprising:
          an annular shroud defining an interior with a mixing chamber;
          a center body located within the interior and having a first fuel nozzle; and
          an annular swirler located within the interior, the annular swirler having a first annular wall proximate the annular shroud and circumscribing the center body, with the first annular wall spaced from the annular shroud to define an outer annular passage, the annular swirler having a second annular wall circumscribing the center body and spaced from the center body to define an inner annular passage, wherein:

the outer annular passage is configured to emit a first non-swirling airflow into the mixing chamber as a first air film along the annular shroud;

the inner annular passage is configured to emit a second non-swirling airflow into the mixing chamber as a second air film located along the center body;

the annular swirler is configured to emit a swirling airflow into the mixing chamber between the first non-swirling airflow and the second non-swirling airflow; and the first fuel nozzle is configured to emit a flow of fuel into the mixing chamber.

12. The combustor of claim 11, further comprising a set of second fuel nozzles configured to emit a second flow of fuel into the swirling airflow.

13. The combustor of claim 12, wherein the annular swirler comprises a set of vanes, with the set of second fuel nozzles positioned on the set of vanes.

14. The combustor of claim 12, further comprising a second fuel passage located within the interior and having the set of second fuel nozzles.

15. A method of mixing fuel in a fuel injector configured to deliver a mixture of air and fuel to a combustor of a turbine engine, the method comprising:

emitting a first non-swirling airflow into a mixing chamber within the fuel injector;

emitting a second non-swirling airflow into the mixing chamber and spaced from the first non-swirling airflow;

emitting, via a swirler, a first swirling airflow into the mixing chamber between the first non-swirling airflow and the second non-swirling airflow wherein the swirler includes a first annular wall spaced from an annular shroud to define an outer annular passage for the first non-swirling airflow, the swirler having a second annular wall, spaced from the first annular wall, the second annular wall circumscribing and spaced from a center body to define an inner annular passage for the second non-swirling airflow; and emitting a first flow of fuel into the combustor adjacent the second non-swirling airflow.

16. The method of claim 15, wherein the first flow of fuel is swirling.

17. The method of claim 16, further comprising emitting a second flow of fuel into the first swirling airflow.

18. The method of claim 17, wherein the second flow of fuel is non-swirling.

19. The method of claim 17, wherein the second flow of fuel is emitted from at least one vane of the swirler.

20. The method of claim 19, wherein the second flow of fuel is emitted from fuel orifices upstream of a trailing edge of the at least one vane.

\* \* \* \* \*